United States Patent [19]

Richardson

[11] 4,369,713
[45] Jan. 25, 1983

[54] PIPELINE CRAWLER

[75] Inventor: Anthony C. Richardson, Agincourt, Canada

[73] Assignee: Transcanada Pipelines Ltd., Scarborough, Canada

[21] Appl. No.: 198,492

[22] Filed: Oct. 20, 1980

[51] Int. Cl.³ .............................................. B61B 13/10
[52] U.S. Cl. ................................................. 104/138 G
[58] Field of Search .................. 104/138 R, 138 G; 105/365; 15/104.03, 104.05, 104.3 R; 134/166 C, 167 C, 168 C, 169 C; 33/1 H, 178 F; 73/40, 40.5 R, 40.5 A; 254/134.5; 22/466; 250/321, 358 P; 118/105, 254, 306, 317, 408, 622, DIG. 10; 280/782; 285/134, 136

[56] References Cited
U.S. PATENT DOCUMENTS

| | | | |
|---|---|---|---|
| 2,604,521 | 7/1952 | Boucher | 104/138 G |
| 3,094,942 | 6/1963 | Blumel | 104/138 R |
| 3,552,765 | 1/1971 | Ostwald | 280/782 |
| 3,691,385 | 9/1972 | Ketchbaw et al. | 250/321 X |
| 3,718,978 | 3/1973 | Van Klevering et al. | 104/138 G X |
| 3,904,878 | 9/1975 | Burch et al. | 250/321 |
| 4,006,359 | 2/1977 | Sullins et al. | 104/138 G X |
| 4,170,902 | 10/1979 | Pallan | 73/40.5 R X |

Primary Examiner—Randolph Reese
Attorney, Agent, or Firm—Cullen, Sloman, Cantor, Grauer, Scott & Rutherford

[57] ABSTRACT

A pipeline crawler comprises a wheeled power unit and a tractor unit having a plurality of driven wheels for engagement with the interior wall of a pipeline. A flexible power transmission extends from the power unit to the tractor unit for driving the driven wheels and includes a relational connection to permit rotary movement of the tractor unit relative to the power unit.

27 Claims, 13 Drawing Figures

PIPELINE CRAWLER

This invention is concerned with a device which is inserted into a pipeline and which progresses through the pipline under its own power performing a service such as inspection or cleaning during that progression. Such devices are known as pipeline crawlers.

One known type of crawler comprises a truck with driven wheels which bear against the interior surface of the pipeline under the weight of the truck. With such a crawler where the coefficient of friction of the interior surface of the pipeline is low, as with a coated pipeline, or where the crawler must negotiate a grade, traction is lost and wheel slippage occurs.

To avoid this problem it has been proposed that the drive wheels be strongly biased into engagement with the interior surface of the pipeline. This proposal has tended to solve the slippage problem but with this arrangement there is a tendency for the crawler to follow a spiral path along the pipeline and this causes difficulties with conventional power sources which require to be maintained in an upright attitude for effective operation.

Thus, it has been further proposed that the power source should be modified as for example in U.S. Pat. No. 3,904,878 issued Sept. 9, 1975 to C. A. Burch et al. In that patent it is proposed that a two cycle engine with a fuel supply independent of gravity be used. However, a two stroke engine is relatively unreliable and the maintneance of a constant power output cannot be guaranteed so that the use of equipment susceptible to damage resulting from power variations, as for example X-ray equipment, is severely curtailed.

Another proposal has been to provide a crawler with separate inspection, power and tractor units of which the drive is transmitted from the power unit to the tractor unit through a cardan shaft. Such a crawler is described in commonly owned copending application Ser. No. 068,306 filed Aug. 20, 1979, now abandoned. The tractor unit of that crawler has three equiangularly spaced sets of driven wheels each of which is steerable under the control of a gravity responsive device to cause the crawler to progress through the pipeline in an upright attitude. The crawler described in that application has certain advantages over the prior art but the steering system is complicated and because of the tendency of the control system to hunt, the steering system is subject to continuous operation and stress. Additionally, the cardan drive is one which imparts substantial torque across the connection between the power and tractor units causing strain on that connection.

The present invention seeks to avoid these disadvantages and accordingly there is provided in accordance with the present invention a pipeline crawler comprising a tractor unit, a service unit and a power unit of which the power unit is biased by gravity to an upright position and is connected to the tractor unit through a rotational assembly so that the tractor unit may follow its own course through a pipeline i.e. may rotate about its longitudinal axis, while the power unit remains upright.

Most desirably the power source of the power unit comprises an internal combustion engine and an energy converter and said power transmission means extends from the converter to a drive mechanism on the tractor unit. The energy converter may comprise an hydraulic pump and in that case the drive means of the tractor unit comprises hydraulic motor means. In such an arrangement the transmission means include hoses which have an hydraulic swivel connector or rotary union.

Alternatively the energy converter may comprise electrical generating means with the drive mechanism of the tractor unit comprising electric motor means. In such an instance the transmission means would comprise conductors including slip rings to permit relative rotation of the tractor and power units.

It is to be recognized that a single motor, whether it be electrical or hydraulic, may be provided on the tractor unit connected to the drive wheels or there may be a motor associated with each drive wheel.

Other characteristics of the present invention will become apparent from the following description.

Preferred embodiments of this invention are illustrated, schematically, in the accompanying drawings in which.

Figure 1:
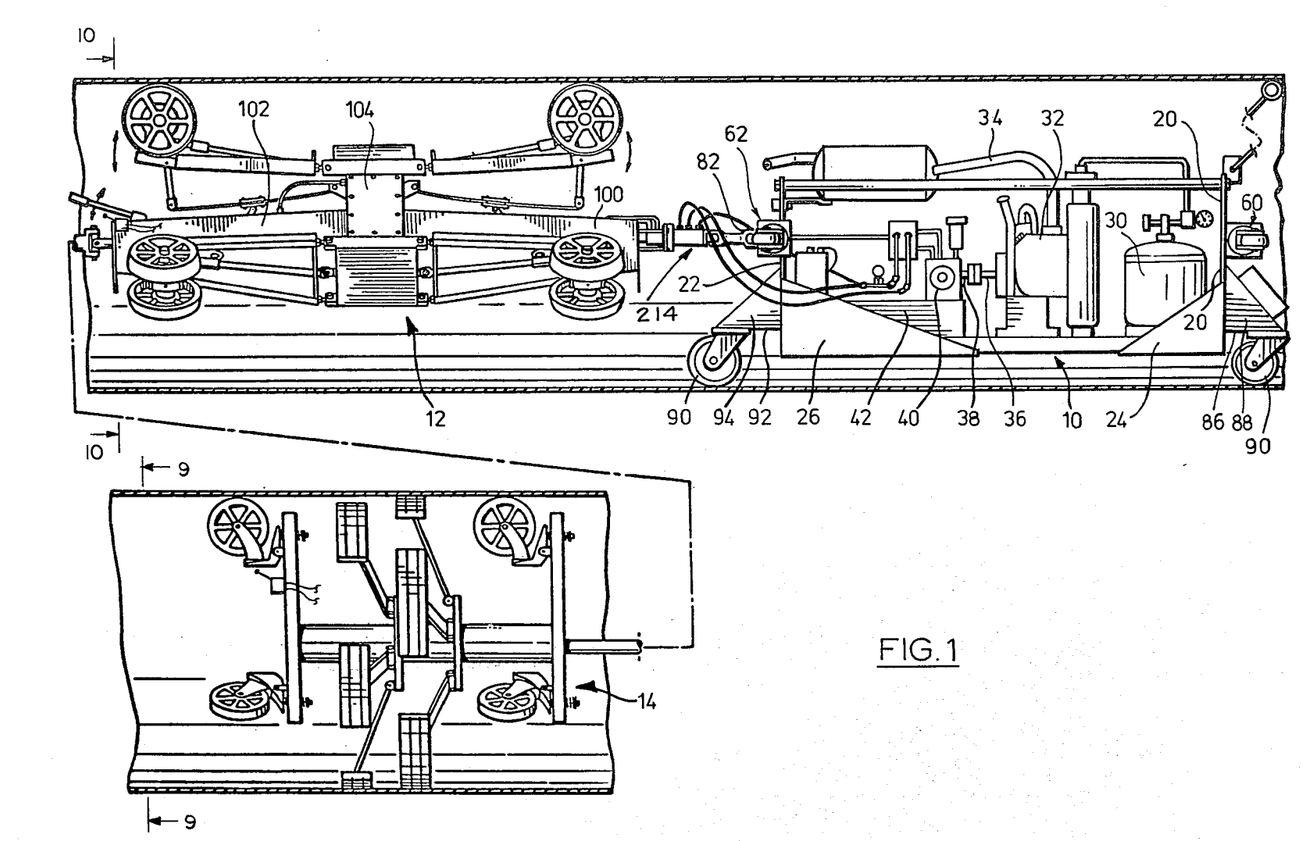
FIG. 1 shows a crawler according to the invention in situ within a pipeline, the drawing being broken in the interests of clarity and the relationship of the parts to opposite sides of the line about which the drawing is broken being indicated in chain-dot line.

The crawler in FIG. 1 comprises a power unit 10, a tractor unit or drive unit 12 and a service unit 14 which in this instance is an inspection unit. The power unit comprises a frame 16, which is illustrated on a large scale in FIG. 8, and which has a pair of longitudinally extending, sealed box section frame elements 18. The frame elements 18, as will become apparent from the following description, serve as a part of a reservoir of an hydraulic system.

Figure 8:
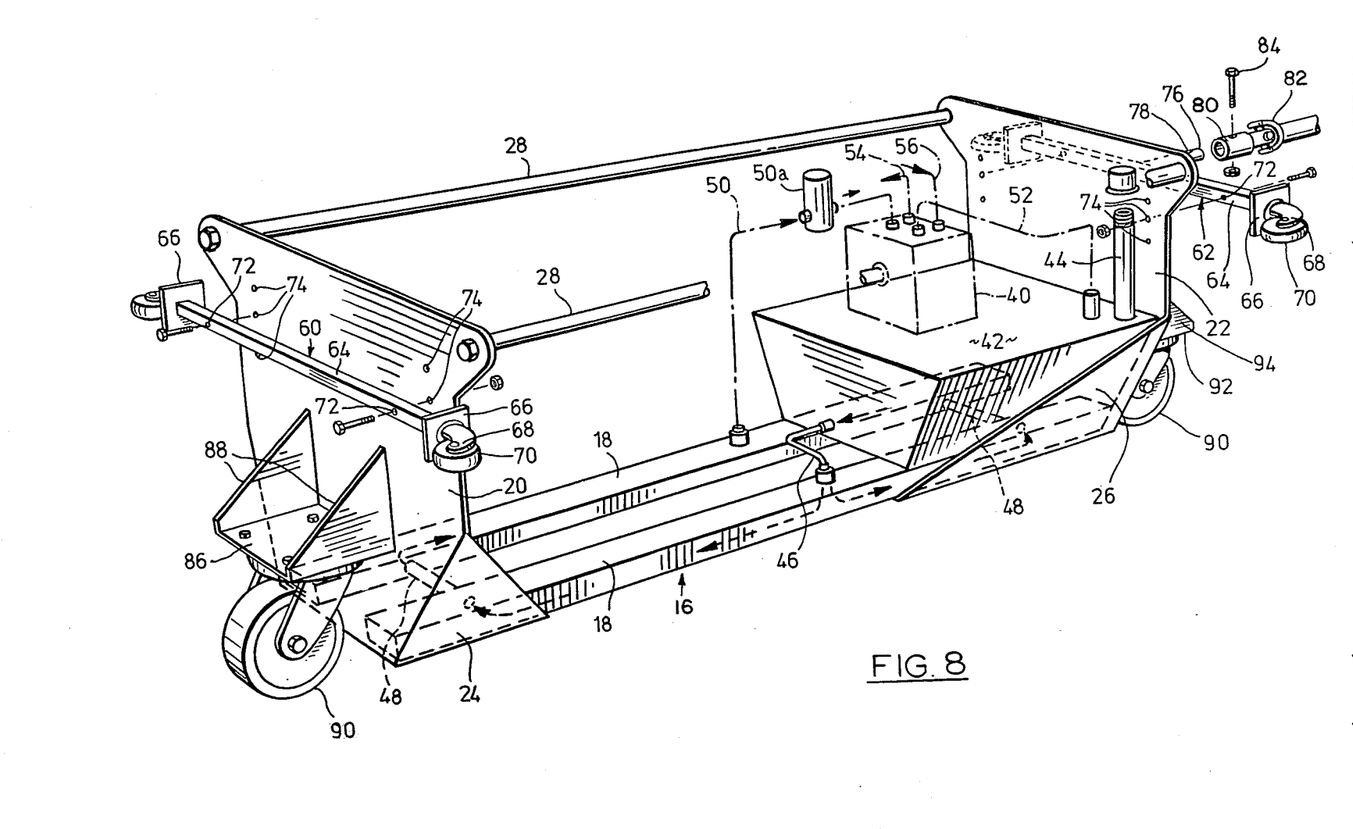
FIG. 8 is a perspective view of the frame of the power unit of the crawler of FIG. 1.

Secured at opposite ends of the frame elements 18 are end plates 20 and 22, the connection of the end plate 20 to the element 18 being reinforced by a pair of fillets, one of which is visible at 24. Similarly the connection of the end plate 22 with elements 18 is reinforced by fillets of which only one is visible at 26. A pair of longitudinally extending ties 28 connect the upper corners of the end plates thus completing the rigid frame.

Referring now to FIG. 1, the fuel tank 30, in this instance, for containing propane, is mounted upon frame elements 18 and through appropriate controls is connected to supply an internal combustion engine 32 which has a conventional exhaust system at 34. The engine 32 has a drive shaft 36 connected to the input shaft 38 of an hydraulic pump 40 and the pump 40 is mounted upon a reservoir tank 42 which, as can be see particularly in FIG. 8, has a filler tube 44. Tank 42 is connected to the interior of frame elements 18 by a conduit 46 and the two frame elements are interconnected by cross conduits 48. A supply conduit 50 including a filter 50a extends between one of the frame elements 18 and the low pressure side of the pump and a return conduit 52 extends between a return port of the pump and the reservoir tank 42. A delivery conduit 54 leads from the pump 40, through a connection described more fully hereinafter, to the tractor unit and the return conduit 56 extends from the tractor unit to the pump.

As can be see in FIG. 1, a castor assembly 60 is secured to end plate 20 of the power unit frame and a similar castor assembly 62 is secured to the end plate 22 of that frame. Castor assembly 60 is clearly visible in FIG. 8 and comprises a crossbar 64 with a plate 66 at each end to each one of which plates, the horn 68 of an associated castor 70 is secured. The crossbar has a pair of through holes 72 which register with a selected pair of holes of the series of holes 74 formed in end plate 20 for a purpose which will become apparent from the subsequent description given with reference to FIG. 9 and 10 and 9a and 10a.

The castor assembly 62 secured to end plate 22 is largely similar to castor assembly 60 save that a short stub 76 projects from it and is provided with a through hole 78. The stub 76 is received within a tubular shaft 80 of one-half of a universal joint indicated at 82 (FIG. 1) and a pin 84 is passed through aligned holes of the shaft 80 and the through hole 78 of stub 76.

A plate 86 projects from end plate 20 and is reinforced by fillets 88 and a castor 90 is secured to the under side of the plate. Similarly, a plate 92 reinforced by fillets of which only one, 94, is visible in FIG. 1, is secured to the end plate 22 of the power unit frame.

The pieces of equipment supported within the power unit are mounted as low as is possible so that the center of gravity of the power unit is below the axis of the pipeline. Since the castors of the castor assemblies 60 and 62 are arranged to lie on the diameter of the pipeline, the power unit will be gravity levelling, i.e. it will always move along the bottom of the pipeline in an upright attitude if it is not subject to some external upsetting force. The utilization of the frame elements 18 as a part of the hydraulic fluid reservoir contributes to this self-stabilizing effect.

The drive or tractor unit comprises a main fore and aft extending body having two generally triangular sectioned frame structures 100 and 102 secured to a central housing structure 104. Three equiangularly spaced booms of which only two, indicated at 106 and 108, are visible in FIG. 2 of the drawings, project forwardly of and are pivoted to the central housing structure. Similarly three equiangularly spaced booms 110, 112 and 114 extend rearwardly from the central housing structure, those booms also being pivoted to the central housing structure. Each of the forwardly extending booms is in a common radial plane with a corresponding one of the rearwardly extending booms.

Figure 2:
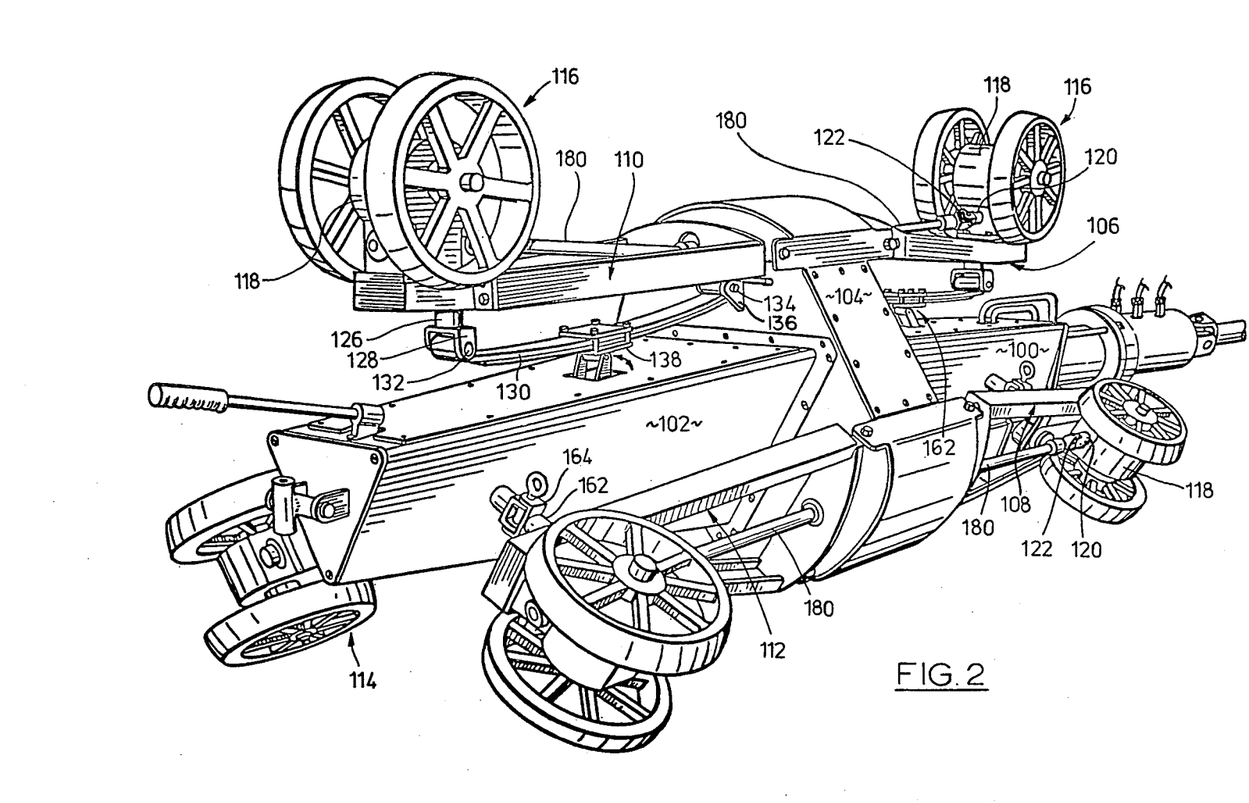
FIG. 2 is a perspective view of the tractor unit of the crawler of the FIG. 1.

Each boom carries non-steerable, driven wheel means 116 at its distal end which wheel means each comprises a pair of wheels for engagement with the interior surface of a pipeline. The wheel means are mounted upon housings 18 which contain change direction gearing through which drive is imparted to the wheel means and a drive input shaft 120 extends from each housing and terminates at a universal joint 122.

The forwardly extending boom 106 and the angularly aligned rearwardly extending boom 110 are substantially similar and for this reason only the boom 110 is described in detail herein. That boom comprises a short stub 126 projecting from a radially inner surface of the housing 118, the stub terminating in a clevis 128. A leaf spring assembly 130 has one end secured between the limbs of the clevis 128, being mounted upon a clevis pin 132 while the other end of the spring assembly is secured to a pin 134 extending between the limbs of a U-shaped bracket 136 which is welded to the housing 104. A reaction plate assembly 138 is secured to the leaf spring assembly 130 at a point about midway between the ends of that spring assembly.

Figure 5:
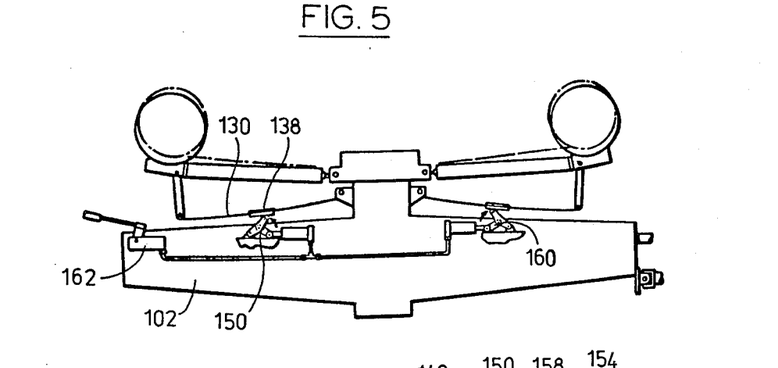
FIG. 5 is a schematic illustration of a part of the drive unit of the crawler of FIG. 1.
Figure 6:
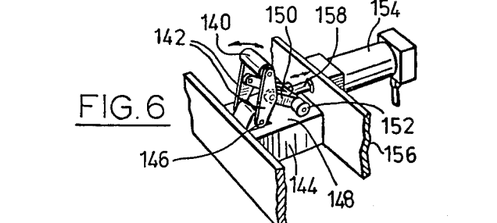
FIG. 6 is a perspective view of a detail of the drive unit of FIGS. 1 and 5.

As can be seen most clearly in FIGS. 5 and 6 the reaction plate 138 cooperates with a roller 140 extending between the distal ends of a levers 142 which are pivoted to a support 144 as at 146, the support providing a reaction surface 148 and being disposed within the frame structure 102.

A pair of levers 150 are pivoted to respective ones of levers 142 and at their distal ends are connected by a crosspiece which has rollers 152 which move along the reaction surface 148. A simple hydraulic jack 154 is connected to a cross member 156 and the ram 158 of the jack extends through that cross member and is secured to the cross piece connected to the distal ends of the levers 150.

A substantially similar assembly indicated at 160 is associated with a boom 106 and the jack of that assembly and the jack 154 are connected with a common hand pump 162, operation of the hand pump causing the jacks to be extended to push the leaf spring assemblies radially outwardly and with those leaf spring assemblies, the booms 106 and 110.

The four remaining booms are all similar and each comprises a stub of which only that at 162 on boom 112 is visible in FIG. 2. Each stub 162 terminates in a clevis 164 of which the limbs have opposed openings. A stub 166 projects from an adjacent part of the frame structure and terminates in a clevis 168 matching clevis 164. A pin 170 is passed through the aligned openings of the clevis limbs to secure the boom in position.

Once the tractor unit is disposed within a pipeline the hand pump is operated to cause the jacks to press the wheels of the booms into firm engagement with the interior surfaces of the pipeline.

As is more fully described hereinafter, to fit the tractor or drive unit for use in pipelines of different diameters the usually fixed booms may be removed to be replaced by booms having stubs 162 of different lengths. Alternatively the connections between those booms and the frame structures may be adjustable as for example by arranging that the connections comprise telescoping elements on the booms and frame structures respectively.

As described hereabove, each housing 118 of the booms of the drive or tractor unit comprises a drive input shaft 120 which extends from the housing to a universal joint 122. Connected to the other side of each universal joint 122 is a drive shaft 180 which extends from the respective housing 118 to the central housing structure 104 of the body of the drive unit.

Figure 7:
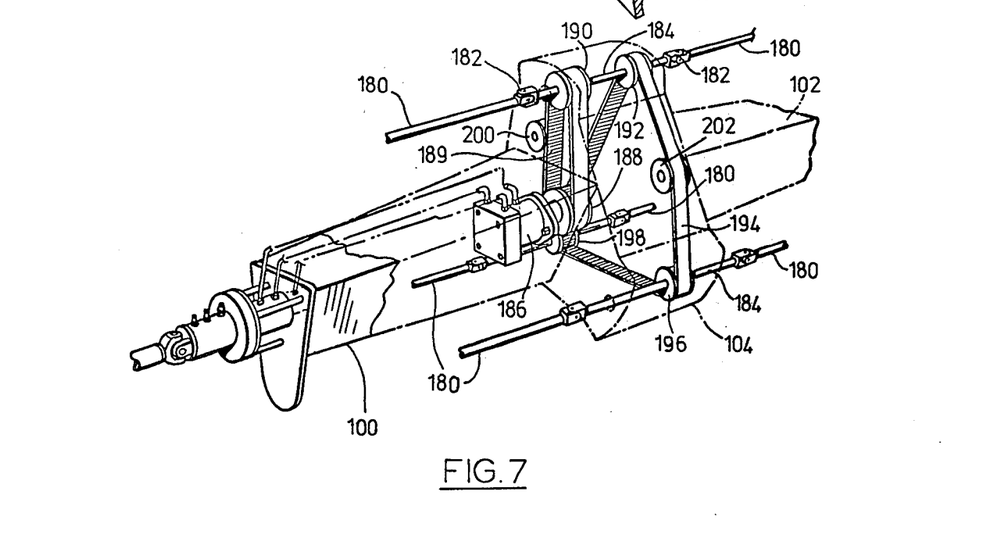
FIG. 7 is a perspective view of the drive unit of FIGS. 1 and 5 with parts removed in the interests of clarity.

Reference is now made to FIG. 7 in which the apparatus for driving the wheel means of the drive unit is schematically illustrated. Each of the drive shafts 180 terminates at a universal joint 182 at its end remote from its respective wheel means. Three shafts 184 are mounted in suitable bearings (not shown) for rotation within central housing structure 104, those shafts being equiangularly disposed about the axis of the drive unit and each being connected to a universal joint 182 and being angularly aligned with the shaft 180 of angularly aligned pairs of the fore and aft extending booms.

Centrally mounted to the housing structure 104 is an hydraulic motor 186 which is driven by the pump 40 through a transmission described in detail hereinafter. A main drive pulley 188 is keyed to the output shaft of the motor 186 and a toothed belt 189 transmits drive from pulley 188 to a pulley 190 keyed to one of the shafts 184. A second pulley 192 is keyed to the same shaft 184 as is pulley 190 and a toothed belt 194 is trained around pulley 192 and matching pulleys 196 and 198 of the others of the shafts 180 to distribute drive to those shafts and thence to the wheel means of the booms of the drive units. Adjustable tensioning pulleys 200 and 202 are associated with the belts 189 and 194 respectively.

Figure 3:
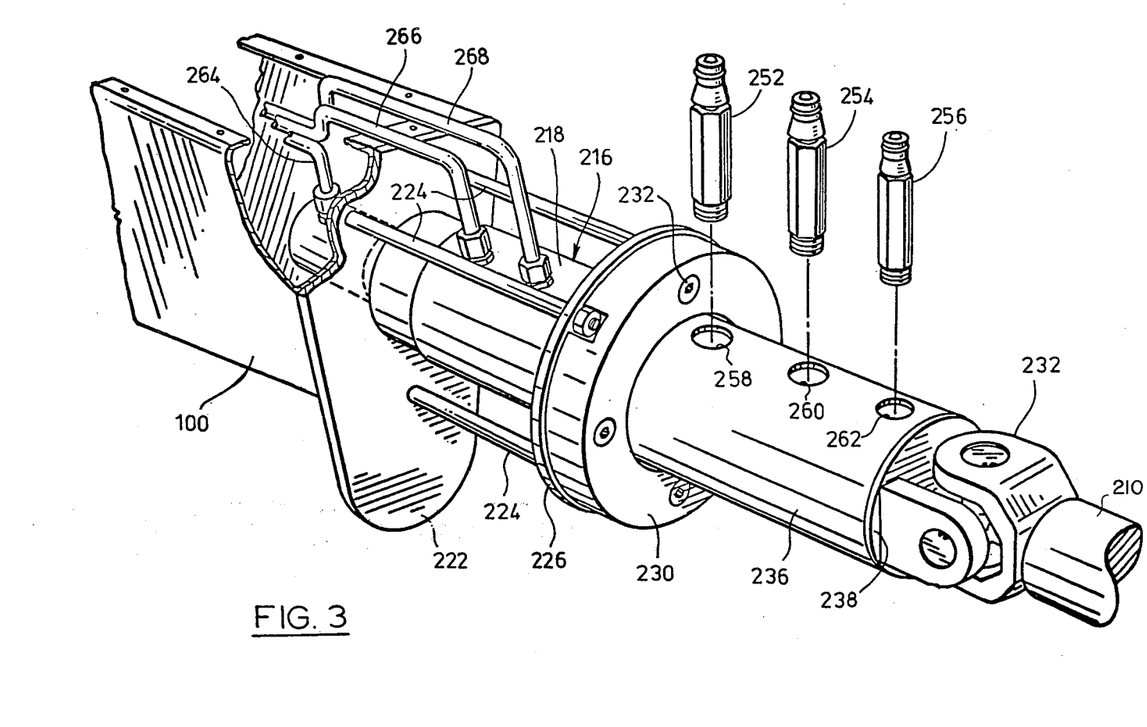
FIG. 3 is a perspective view of a detail of the connection between the power and drive units of the crawler of FIG. 1.
Figure 4:
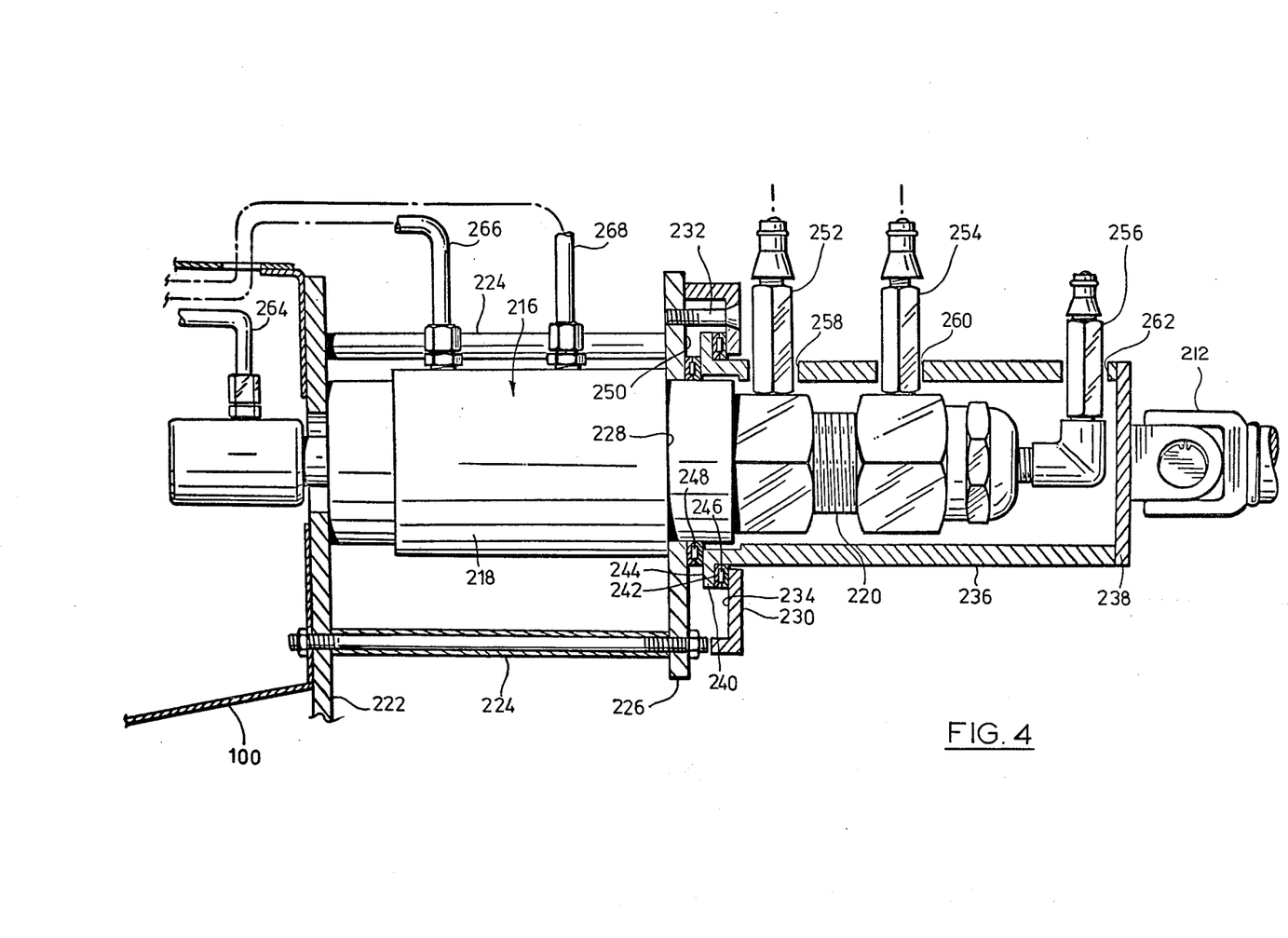
FIG. 4 is a longitudinal cross-section of the detail in FIG. 3.

To connect the power unit with the tractor or drive unit a shaft 210 extends between universal joint 82 of the power unit and a universal joint 212 secured to a swivel connector indicated generally at 214 and illustrated on a larger scale in FIGS. 3 and 4.

The swivel connector comprises a rotary union 216 which is of a known kind being available from Deublin Company of Northbrook, Ill., and which is illustrated in the Engineering Catalogue 777 of that company which is entitled Deublin Rotating Unions. The specific union is identified in that catalogue as model 1895. It comprises an outer body 218 and a rotor 220. The outer body is secured to an end wall 222 of frame structure 100 by means of tie rods 224 which clamp the outer body 218 to wall 222 by means of a plate 226 which bears against the shoulder surface 228 of the outer body.

A generally L-sectioned annular ring 230 is secured to plate 226 by means of screws 232, the ring 230 exhibiting a radially disposed annular flange surface 234. Surrounding the rotor 220 is a generally cylindrical casing 236 which is closed at one end by a disc-shaped closure 238 to which the universal joint 212 is secured.

A radially outwardly extending flange 240 is formed at the end of the casing 236 opposite to closure 238, that flange exhibiting radially disposed flange surfaces 242 and 244 and a thrust bearing 246 is disposed between the surface 234 of flange 230 and surface 242 of flange 240. Similarly a thrust bearing 248 is disposed between surface 250 of plate 226 and surface 244 of flange 240. The two thrust bearings serve to permit rotation of the rotor and its casing 236 relative to the outer body 218 of the union while linear motion is transmitted by the drive unit to the power unit.

Quick release fittings 252, 254, and 256 protrude through openings 258, 260 and 262 respectively of the casing 236 to permit the easy connection and disconnection of hoses on the power unit to the ports of the rotor of union 216. Screw threaded connections are made between hoses 264, 266, and 268 of the drive unit and the ports of the outer body of the union. A hose secured to fitting 252 constitutes a delivery line to the hydraulic motor of the drive unit, that connection being completed through hose 268; a hose connected to fitting 254 constitutes the return line from the motor to the pump of the power unit, the return line being completed by hose 266; and the hose 264 and a hose connected to fitting 256 may comprise either a drain line or a control line.

The service unit 14 may be of any convenient type as for example it may be an inspection unit of the kind commonly called an electronic pig.

It will be appreciated that with the arrangement here described, the drive unit may follow any course through the pipeline, i.e. it may spiral. However the power unit will, under the influence of gravity remain in a relatively constant angular disposition within the pipe. It will be appreciated that any torque transmitted from the drive unit to the power unit through the swivel connection will be insufficient to overcome the gravitational force maintaining in the power unit in its upright attitude.

Figure 9:
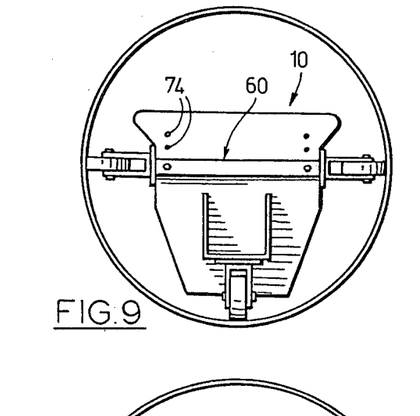
FIGS. 9 and 10 are simplified cross-sections on the lines 9—9 and 10—10 respectively of FIG. 1.
Figure 9A:
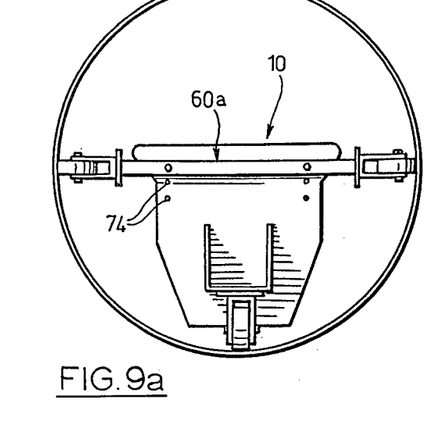
FIGS. 9a and 10a are simplified cross-sections on the lines of 9—9 and 10—10 of FIG. 1 showing the power and drive units respectively as modified for use in a pipeline of larger diameter than that in FIGS. 9 and 10.

FIGS. 9 and 10 and FIGS. 9a and 10a illustrate how the power units and drive units have been modified to be used in pipelines of different diameters. It will be appreciated that the castor assembly 60 of the power unit of FIG. 9 is replaced in FIG. 9a by a longer assembly 60a and the longer assembly is mounted in a higher pair of the series of holes 74 of the end wall of the power unit frame so as to dispose the assembly on a diameter of the pipeline.

Figure 10:
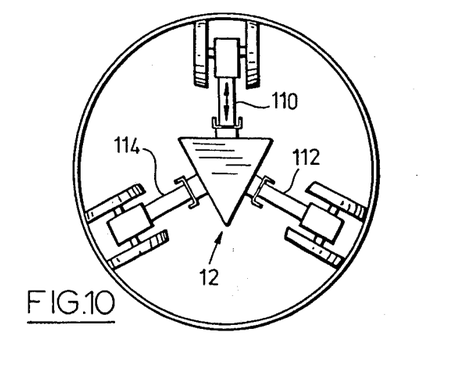
Figure 10A:
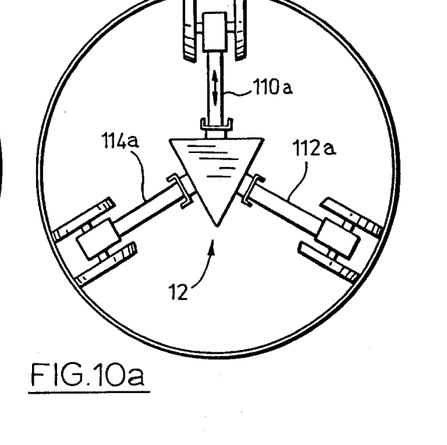

On the drive unit the booms 112 and 114 of FIG. 10 are replaced by booms 112a and 114a in FIG. 10a, the booms 112a and 114a having longer stubs connecting them to the frame structure 102. Similarly the other "fixed" booms of the drive unit would be replaced. The ram controlling the position of boom 110 is then operated to ensure firm engagement of the wheels of the drive unit with the internal surface of the pipeline.

Figure 11:
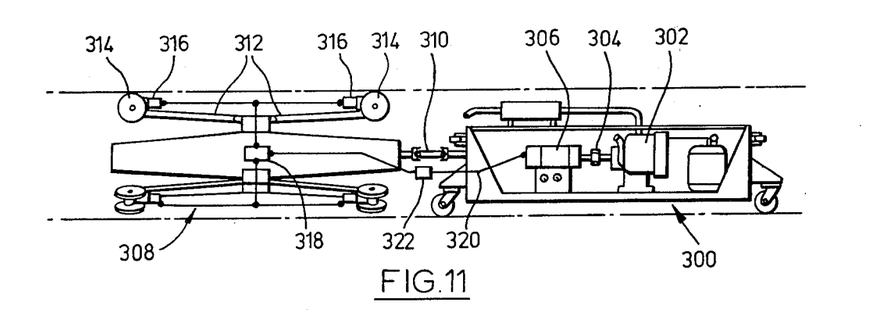
FIG. 11 is a schematic illustration of an alternative form of the crawler of this invention.

A further embodiment of the present invention is illustrated, very schematically, in FIG. 11. The embodiment in FIG. 11 is, in many respects similar to that described with reference to FIGS. 1 through 10a and for this reason only the differences between the embodiments will be described.

The drive unit 300 comprises a motor 302 which, through a connection 304, drives an electrical generator 306. The power unit is mechanically connected to the tractor unit 308 through shafts 310 and the tractor unit comprises booms 312 each with wheel means 314. Associated with each wheel means is an electric motor 316 the motors being supplied through a junction box 318 from the generator 306. The connection 320 between the power unit and the tractor unit includes a slip ring assembly 322 which may be of any convenient form.

It will be appreciated that if desired this latter embodiment may be modified by the inclusion of a single electric motor on the tractor unit with drive being transmitted to the individual wheel means through an appropriate mechanical transmission, as for example that illustrated in FIG. 7.

Various modifications of the present invention will be apparent to those skilled in the art. As noted hereabove it is possible to use a single motor on the tractor means with a transmission to apply drive to the individual wheel means. The alternative of course is to provide the individual motors associated with each wheel means. Additionally the motors may be electrical or they may be hydraulic. Further, while in the particular embodiment of this invention illustrated herein, the power source or prime mover is illustrated as a propane internal combustion engine, it is apparent that other engines could be used with effect.

I claim:

1. A pipeline crawler comprising a tractor unit having a plurality of equiangularly spaced driven wheels for engagement with the interior wall of a pipeline, a gravity levelling power supply unit and power and traction transmission means connecting said units, said power transmission means including means for transmitting power from said power supply unit to said tractor unit, mechanical connection means for transmitting traction forces from said tractor unit to said power supply unit and means permitting the tractor unit to rotate freely relative to said power supply unit about the longitudinal axis of the pipeline.

2. A pipeline crawler comprising a tractor unit having a plurality of driven wheels for engagement with the interior wall of a pipeline, a self-righting power unit and means connecting said tractor unit to said power unit, said connecting means comprising power transmission means for transmitting power from said power unit to said tractor unit, said power transmission means comprising a first rotary connection, and mechanical connection means for transmitting traction forces from said tractor unit to said power unit, said mechanical connection means comprising a second rotary connection and said first and second rotary connections being coaxial to permit rotation of said tractor unit relative to said power unit.

3. A pipeline crawler as claimed in claim 2 wherein said power unit comprises a wheeled truck having its center of gravity low and tending to maintain an upright attitude under the influence of gravity.

4. A pipeline crawler as claimed in claim 3 wherein said power supply comprises an internal combustion engine and an energy converter and said power transmission means extends from said converter to a drive mechanism on said tractor unit.

5. A pipeline crawler as claimed in claim 4 wherein said energy converter comprises an hydraulic pump and said drive mechanism comprises hydraulic motor means, said transmission means comprising hose means and including an hydraulic swivel connector.

6. A pipeline crawler as claimed in claim 5 wherein said hydraulic motor means comprises a single motor and where means are provided delivering drive from said motor to said wheels.

7. A pipeline crawler as claimed in claim 4 wherein said energy converter comprises electricity generating means, said drive mechanism comprises electric motor means and said transmission means comprises conductors including slip ring means.

8. A pipeline crawler as claimed in claim 3 wherein said truck comprises fore and aft castor wheel means for engagement with the lowermost part of the interior wall of the pipeline.

9. A pipeline crawler as claimed in claim 8 wherein said truck comprises a front pair of horizontally opposed castor wheels and a rear pair of horizontally opposed castor wheels.

10. A pipeline crawler as claimed in claim 9 wherein the castor wheels of each pair of castor wheels are disposed to engage substantially diametrically opposed portions of the internal wall of said pipeline.

11. A pipeline crawler as claimed in claim 10 wherein the castor wheels of said front pair of castor wheels are mounted at opposite ends of a horizontally disposed support bar.

12. A pipeline crawler as claimed in claim 11 wherein said support bar is releasably secured to said truck for replacement by a bar of a different length.

13. A pipeline crawler as claimed in claim 3 wherein said truck comprises a front pair of horizontally opposed castor wheels and a rear pair of horizontally opposed castor wheels.

14. A pipeline crawler as claimed in claim 13 wherein the castor wheels of each pair of castor wheels are disposed to engage substantially diametrically opposed portions of the internal wall of said pipeline.

15. A pipeline crawler as claimed in claim 14 wherein the castor wheels of said front pair of castor wheels are mounted at opposite ends of a horizontally disposed support bar.

16. A pipeline crawler as claimed in claim 15 wherein said support bar is releasably secured to said truck for replacement by a bar of a different length.

17. A pipeline crawler as claimed in claim 3 wherein said truck comprises a frame having fore and aft extending frame elements defining a base upon which an internal combustion engine and associated supply and control equipment is supported.

18. A pipeline crawler as claimed in claim 17 wherein at least a part of said base is hollow and constitutes a part of a fluid reservoir.

19. A pipeline crawler as claimed in claim 3 wherein said transmission means is hydraulic and wherein at least a part of said truck is hollow and constitutes at least a part of a reservoir for hydraulic fluid for use in said hydraulic transmission system.

20. A pipeline crawler as claimed in claim 2 wherein means are provided for strongly biasing said drive wheels into engagement with the interior wall of a pipeline.

21. A pipeline crawler as claimed in claim 2 wherein said power unit comprises an internal combustion engine and an energy converter and said power transmission means extends from said converter to a drive mechanism on said tractor unit.

22. A pipeline crawler as claimed in claim 21 wherein said energy converter comprises an hydraulic pump and said drive mechanism comprises hydraulic motor means, said power transmission means comprising hose means and said first rotary connection comprising an hydraulic swivel connector.

23. A pipeline crawler as claimed in claim 22 wherein said hydraulic motor means comprises a single motor and wherein means are provided delivering drive from said motor to said wheels.

24. A pipeline crawler as claimed in claim 21 wherein said energy converter comprises electricity generating means, said drive mechanism comprises electric motor means and said transmission means comprises conductors including slip ring means.

25. A pipeline crawler as claimed in claim 2 said mechanical connection means comprise universal connection means to permit articulation of said units.

26. A pipeline crawler as claimed in claim 25 wherein said universal connection means comprises a shaft having a universally pivoted connection to said tractor unit at one end and a universally pivoted connection to said power unit at its other end.

27. A pipeline crawler as claimed in claim 2 wherein said mechanical connection means comprise first and second opposed radially disposed annular flanges fixed relative said tractor unit, a third radially disposed annular flange position between said first and second flanges and fixed relative to said power unit and thrust bearing means comprising a first thrust bearing disposed between one of said first and second flanges and said third flange and a second thrust bearing between the other of said first and second flanges and said third flange.

* * * * *